(12) United States Patent
Baumann

(10) Patent No.: US 6,973,941 B2
(45) Date of Patent: Dec. 13, 2005

(54) CONTROL VALVE WITH LOW NOISE AND ENHANCED FLOW CHARACTERISTICS

(75) Inventor: Hans D. Baumann, Rye, NH (US)

(73) Assignee: Fisher Controls International LLC, St. Louis, MO (US)

(*) Notice: Subject to any disclaimer, the term of this patent is extended or adjusted under 35 U.S.C. 154(b) by 0 days.

(21) Appl. No.: 10/980,726

(22) Filed: Nov. 3, 2004

(65) Prior Publication Data

US 2005/0061375 A1    Mar. 24, 2005

Related U.S. Application Data

(62) Division of application No. 10/326,788, filed on Dec. 19, 2002.

(51) Int. Cl.[7] .............................................. F16K 1/54
(52) U.S. Cl. .................................. 137/625.37; 251/362
(58) Field of Search ...................... 137/625.3, 625.33, 137/625.37, 625.38; 251/362

(56) References Cited

U.S. PATENT DOCUMENTS

| | | | |
|---|---|---|---|
| 1,307,986 A | 6/1919 | Randall et al. | 137/625.39 |
| 1,851,016 A * | 3/1932 | Skelly | 251/235 |
| 2,541,176 A | 2/1951 | Rockwell | |
| 2,918,087 A | 12/1959 | Curran | |
| 3,135,286 A | 6/1964 | Baumann | 137/315 |
| 3,219,310 A | 11/1965 | Baumann | 251/61 |
| 3,304,949 A | 2/1967 | Baumann | 137/270 |
| 3,776,278 A | 12/1973 | Allen | 137/625.38 |
| 3,813,079 A * | 5/1974 | Baumann et al. | 251/127 |
| 3,908,698 A | 9/1975 | Baumann | 137/625.3 |
| 4,018,245 A | 4/1977 | Baumann | 137/270 |
| 4,024,891 A | 5/1977 | Engel et al. | 137/625.3 |
| 4,041,973 A | 8/1977 | Rice et al. | 137/315 |
| 4,108,210 A | 8/1978 | Luthe et al. | 138/42 |
| 4,149,563 A * | 4/1979 | Seger | 137/625.3 |
| 5,180,139 A | 1/1993 | Gethmann et al. | 251/127 |
| 5,193,583 A | 3/1993 | Gethmann et al. | 137/625.32 |
| 5,332,004 A | 7/1994 | Gethmann et al. | 137/625.32 |

(Continued)

FOREIGN PATENT DOCUMENTS

DE    857 578    12/1952

(Continued)

OTHER PUBLICATIONS

"Coefficients and factors Relating to Aerodynamic Sound Level Generated by Throttling Valves", Baumann, *Noise Control Engineering Journal*, Jan.-Feb. 1984.

(Continued)

*Primary Examiner*—John Fox
(74) *Attorney, Agent, or Firm*—Marshall, Gerstein & Borun LLP

(57) ABSTRACT

A control valve that reduces noise and controls flow includes a slotted cylindrical skirt and/or a tapered metal ring. The metal ring has a tapered external surface for engaging a matching tapered bore within a valve housing. One embodiment is directed to a control valve including a housing defining a central orifice in fluid in communication with an inlet port and an outlet port, and a movable valve plug assembly having a skirt portion slidably engaged within the central orifice to control fluid flowing through the housing. The skirt portion defines a plurality of openings, which can be slots, to gradually control the flow of fluid through the housing while reducing cavitation. A method of controlling fluid flow in a process includes receiving fluids via an inlet port of a control valve, and controlling the flow of the fluid via a movable skirted valve plug with a plurality of tapered slots.

10 Claims, 6 Drawing Sheets

U.S. PATENT DOCUMENTS

| | | | |
|---|---|---|---|
| 5,400,825 A | 3/1995 | Gethmann et al. | 137/625.32 |
| 5,769,122 A | 6/1998 | Baumann et al. | 137/625.33 |
| 5,941,281 A | 8/1999 | Baumann et al. | 137/625.33 |
| 5,964,248 A * | 10/1999 | Enarson et al. | 137/625.39 |
| 6,026,859 A | 2/2000 | Wears et al. | 137/625.33 |
| 6,095,196 A | 8/2000 | McCarty et al. | 138/42 |
| 6,766,826 B2 | 7/2004 | Baumann | 137/625.3 |

FOREIGN PATENT DOCUMENTS

| | | |
|---|---|---|
| DE | 26 46 837 A1 | 4/1978 |
| DE | 28 38 973 | 4/1980 |
| EP | 0 432 873 | 6/1991 |
| GB | 274 252 | 7/1927 |

OTHER PUBLICATIONS

Drawing of known Balance Cage-Guided Control Valve.

International Search Report for PCT/US03/34995, issued Mar. 9, 2004.

International Search Report for PCT/US03/34995, issued Jun. 4, 2004.

* cited by examiner

CONTROL VALVE WITH LOW NOISE AND ENHANCED FLOW CHARACTERISTICS

RELATED APPLICATIONS

This application is a Divisional of U.S. patent application Ser. No. 10/326,788 which was filed on Dec. 19, 2002 entitled "Control Valve with Low Noise and Enhanced Flow Characteristics."

FIELD OF THE INVENTION

The present invention relates to control valves in general and, more specifically, to a control valve with a low-noise plug and enhanced flow characteristics suited for high pressure uses.

BACKGROUND OF THE INVENTION

There are many uses for high pressure control valves, including controlling flow of gas, steam, water and the like to compensate for load disturbances and regulate process variables within a control loop. Modern high-pressure control valves use low-noise trim to enable high pressure gases and liquids to flow without excessive noise and to maintain a desired flow coefficient (Cv). Valve plugs used to modulate the flow rate under high pressure and changing pressure conditions include globe valves that use either a seat ring trim or a cage trim. A globe valve with an integral seat ring and an unbalanced valve plug is generally chosen for smaller valve sizes. In contradistinction, larger valve sizes, in order to be pressure balanced and provide for low noise, generally incorporate cage-type trim.

There are significant reasons to prefer a seat ring type trim to a cage-type trim for a control valve. For example, globe valves with a seat ring trim are lower in cost, and do not present thermal expansion problems. These valves provide better alignment of the valve plug with the valve seat and require only one gasket. Valves with seat ring trim can also incorporate a skirt that at least partially obstructs fluid flow, reducing the amount of flow in a fully open valve. In a worst case, a skirt can produce vortices, turbulence and pressure gradients causing hydrodynamic plug forces and cavitations. From the laws of fluid mechanics, it is known that when a fluid discharges from an orifice into an enlarged space a velocity head loss occurs. When pressure is reduced to vapor pressure, localized gaseous conditions occur within a liquid stream. Conversely, Bernoulli's principle provides that fluids entering a reduced area orifice from an enlarged space experience increased velocity. Thus, in a skirted valve, lowered pressure combined with skirt obstructions potentially reduces fluid flow below a desired Cv.

Known methods of addressing the problems with skirted valves include preventing or reducing erosion caused by flashing and cavitations by providing sliding stem angle valves and valves with expanded flow areas downstream of a throttling point because the erosive velocity is reduced. For those areas where the fluid must impact the valve surfaces, such as at the seating surfaces, materials are chosen that are as hard as possible. One known method of preventing cavitation in general is to control the pressure drop across the valve such that the local pressure never drops below the vapor pressure, thereby preventing vapor bubbles from forming. Without vapor bubbles to collapse, there is no cavitation. One known method of controlling the pressure drop across the valve is to split the total pressure drop across the valve using multiple stage trims. These known solutions come at the price of additional expense in further trim requirements, such as additional components and costly materials. Thus, there is a need for a control valve that provides low-noise characteristics while maintaining adequate flow rates for fluids, including gaseous fluids, which have similar noise control requirements.

SUMMARY OF THE INVENTION

A control valve is disclosed which has improved noise characteristics and control characteristics over those normally associated with cage-free control valves. The control valve has noise-reducing and flow controlling components including one or both of a slotted cylindrical skirt and a tapered metal ring that provides a fluid-tight seal between the valve housing and the metal ring. The purpose of the metal ring is to provide a low cost alternative to a conventional screwed-in seat ring and to reduce the size of the required bonnet opening.

One embodiment is directed to a control valve including a housing defining a central orifice in fluid in communication with an inlet port and an outlet port, and a movable valve plug assembly having a skirt portion slidably engaged within the central orifice to control fluid flowing through the housing. The skirt portion defines a plurality of openings which can be slots to gradually control the flow of fluid through the housing while reducing cavitation. The lower terminating end of the control valve plug incorporates concave openings.

In one embodiment, the plurality of slots have lengths that progressively increase towards the lower terminating end, and each slot expands from the outside diameter of the cylindrical skirt portion at an angle of no less than 8 degrees and no more than 30 degrees. In an embodiment, plurality of slots are configured to be at varying distances from the lower terminating end of the cylindrical skirt along the circumference to prevent steps in the rate of flow through the control valve when the valve plug is being positioned.

In a further embodiment, the control valve includes a metal ring with a tapered external surface for engaging a matching tapered bore within the valve housing. The smallest diameter of the tapered external surface at a lower terminating end of the metal ring incorporates a thinned and deformable portion capable of being pressed against a portion of the valve housing to secure the metal ring to the valve housing. In an embodiment, the taper of the external surface of the metal ring is no less than 0.5 degrees and no more than 6 degrees.

Another embodiment is directed to a valve plug capable of being slidably engaged within the central orifice of a control valve, including a top stem portion and a cylindrical skirt portion. The cylindrical skirt portion defines a plurality of slots of decreasing horizontal width relative to a lower terminating end of the cylindrical skirt portion and have varying distances from the lower terminating end.

A further embodiment is directed to a method of controlling fluid flow in a process. The method includes receiving fluids via an inlet port of a control valve, the control valve having a housing with an outlet port, a central orifice and a movable skirted valve plug, and controlling the flow of the fluid via the movable skirted valve plug within the central orifice, the skirt defining a plurality of tapered slots for controlling parameters of the fluid flow as the skirted valve plug moves within the central orifice of the control valve. In one embodiment the housing has a tapered bore for providing a seal with a metal ring that has a matched tapered external surface for engaging the tapered bore of the valve housing.

One embodiment is directed to a control valve that can, but does not require a skirted valve plug and includes a metal ring including a tapered external surface for engaging a matching tapered bore within a valve housing.

In yet another embodiment, the skirted valve plug cooperates with a conventional screwed-in seat ring.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
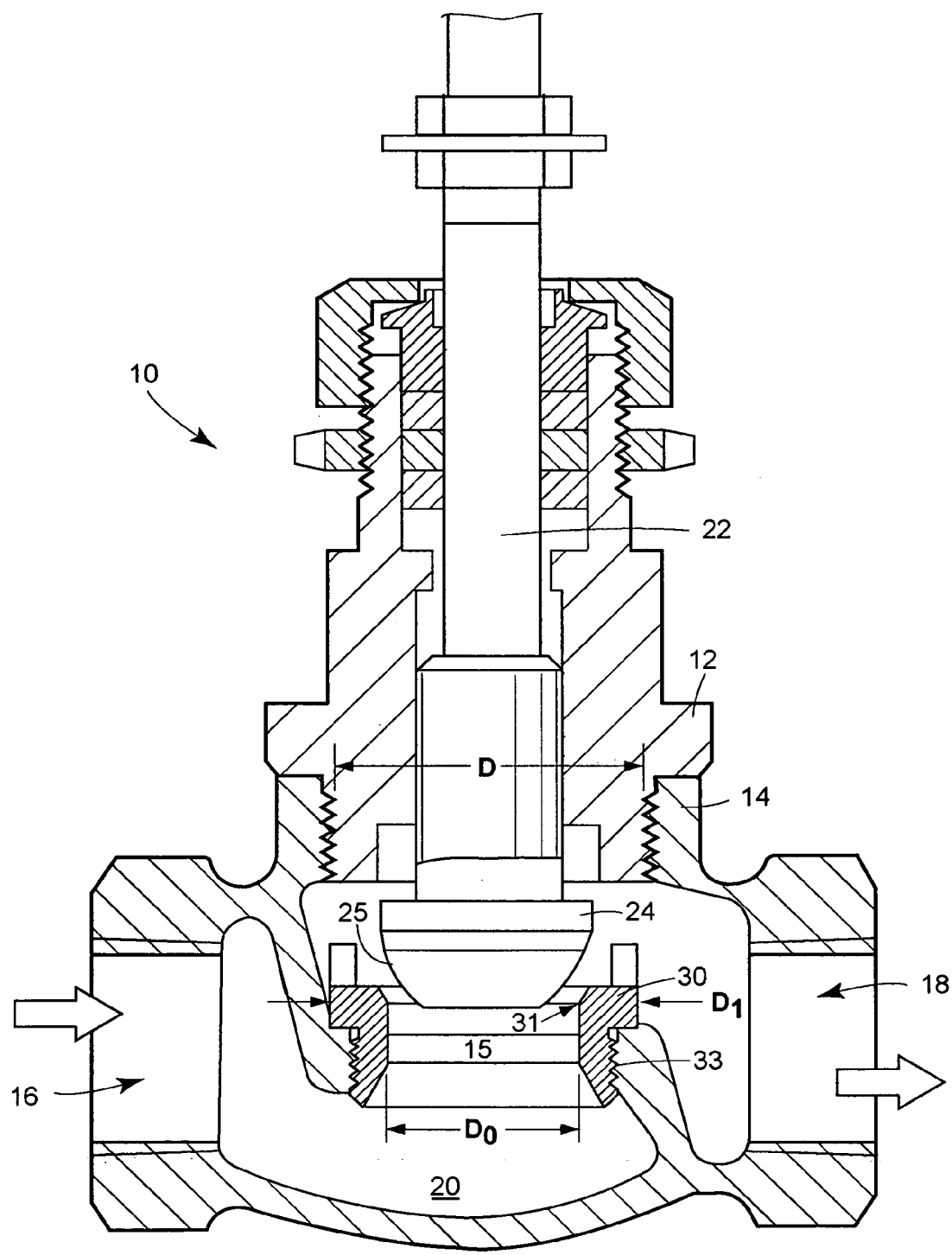
FIG. 1 labeled "prior art" illustrates is a cross-sectional view of a globe valve with a screwed-in seat ring and a conventional parabolic valve plug.

Referring to FIG. 1, a prior art control valve 10 is shown in a cross-sectional view. As shown, the control valve includes a bonnet 12, a valve housing 14 having a fluid inlet 16 and a fluid outlet 18. A connecting fluid passage 20 is defined by the interior walls of the housing 14 and is divided by a central orifice 15. The control valve further includes a plug stem 22 with attached plug 24. The plug stem 22 slidably engages central orifice 15, which is used to control fluid. Control valve 10 further includes an annular valve seat or seat ring 30, which provides a guiding and sealing surface 31 for engagement with valve plug 24 sealing surface 25. Seat ring 30 is shown as a conventional seat ring and includes a threaded surface 33 for screwably receiving control valve housing 14 as shown. Also shown in FIG. 1 are diameter measurements D1 and D0, which represent the inlet diameters through which fluids and gasses pass in the control valve 10. The size D0 is the central fluid passageway and will determine the flow capacity of the valve. Measurement D1, the external seat ring diameter, will determine the size of the top opening D of housing 14, which is an important cost consideration.

Figure 2:
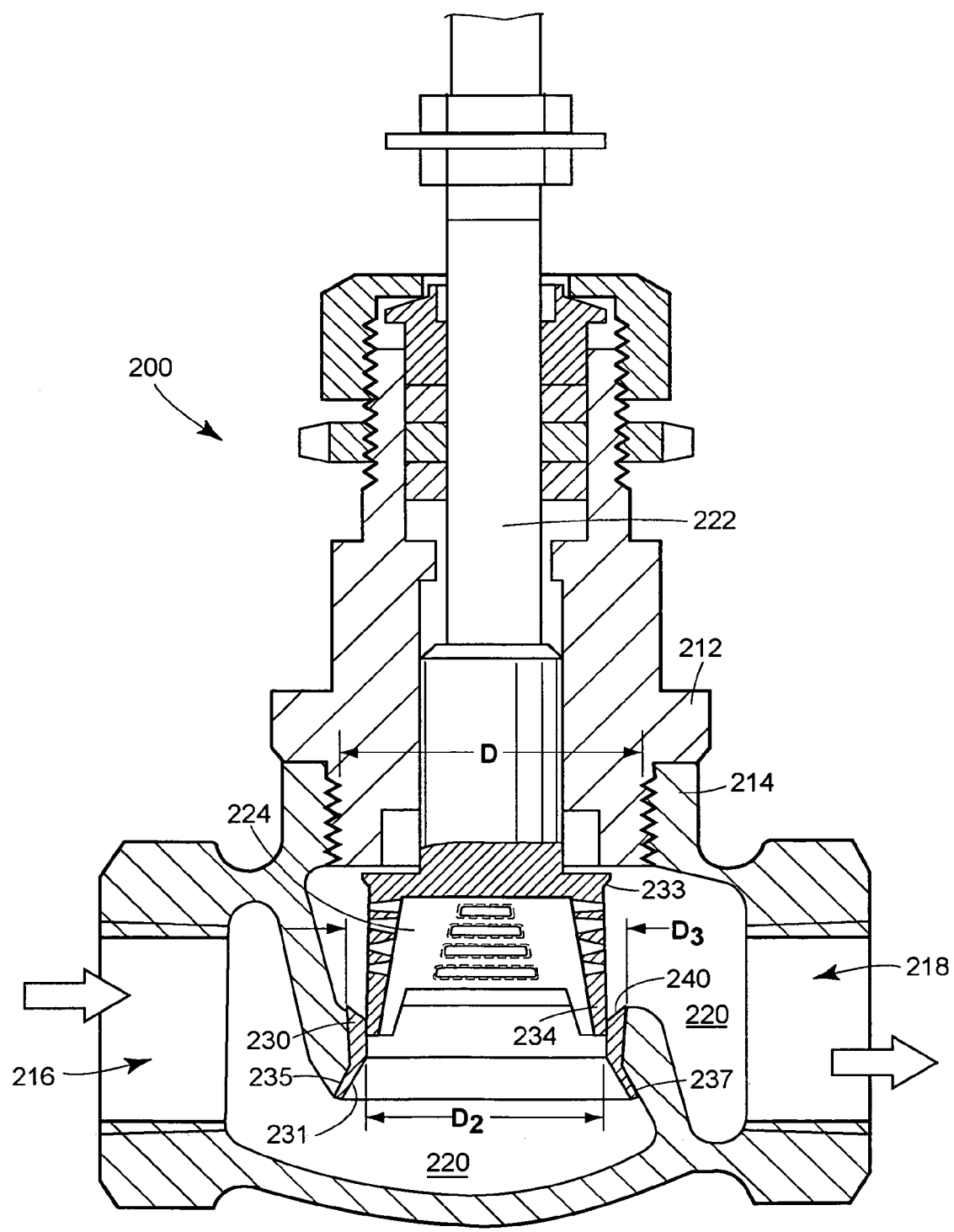
FIG. 2 illustrates a cross-sectional view of a skirted plug valve with a seat ring trim in accordance with an embodiment of the present invention.

Referring now to FIG. 2, an improved control valve is shown. The improved skirt guided control valve 200 is designed to maintain a steady flow of liquid or other fluids through the valve. Control valve 200 includes a bonnet 212, a valve housing 214 that defines an inlet 216 and an outlet 218. The valve housing 214 further defines a central fluid passageway 220. Like control valve 10, valve 200 has a valve stem 222. Unlike control valve 10, however, valve 200 has a skirt guided plug 224 having leg portions 234. Further, unlike valve 10, valve 200 has a seat ring 230 designed in accordance with an embodiment of the present invention. Also, unlike valve 10, control valve 200 provides components that allow for an enlarged orifice diameter D2 compared to that of the prior art D0 shown in FIG. 1. Also shown in FIG. 2 is diameter D3, which shows the external seat ring diameter for seat ring 230.

More specifically, referring to FIGS. 1 and 2 in combination, the difference between diameters D0 and D1 in FIG. 1 is substantial in comparison to the difference between diameter D2 and D3 shown in FIG. 2. The differences in diameter are significant enough to provide increased flow without need for an increase in the size of opening D in housing 214. Rather than provide an external surface for screwing the seat ring 30 to the valve housing 14, as in control valve 10, control valve 200 incorporates a seat ring 230 that includes a tapered portion 231 configured to engage a similarly tapered bore portion 235 within the central orifice of the valve housing 214, as shown. In one embodiment, tapered portion 231 of seat ring 230 is thinned and deformable such that tapered portion 231 can be pressed against a portion of valve housing 214, thereby securing the ring 230 to the valve housing. Advantageously, seat ring 230 can be used in control valves with or without skirt guiding such as skirt guiding provided by cylindrical skirted plug 224, as described with reference to FIG. 4, below. FIG. 2 also illustrates how skirted plug 224 mates with seat ring 230. More specifically, rim of skirted plug 224 includes bevel 233 machined to mate with inner diameter bevel 240 of seat ring 230.

Figure 3:
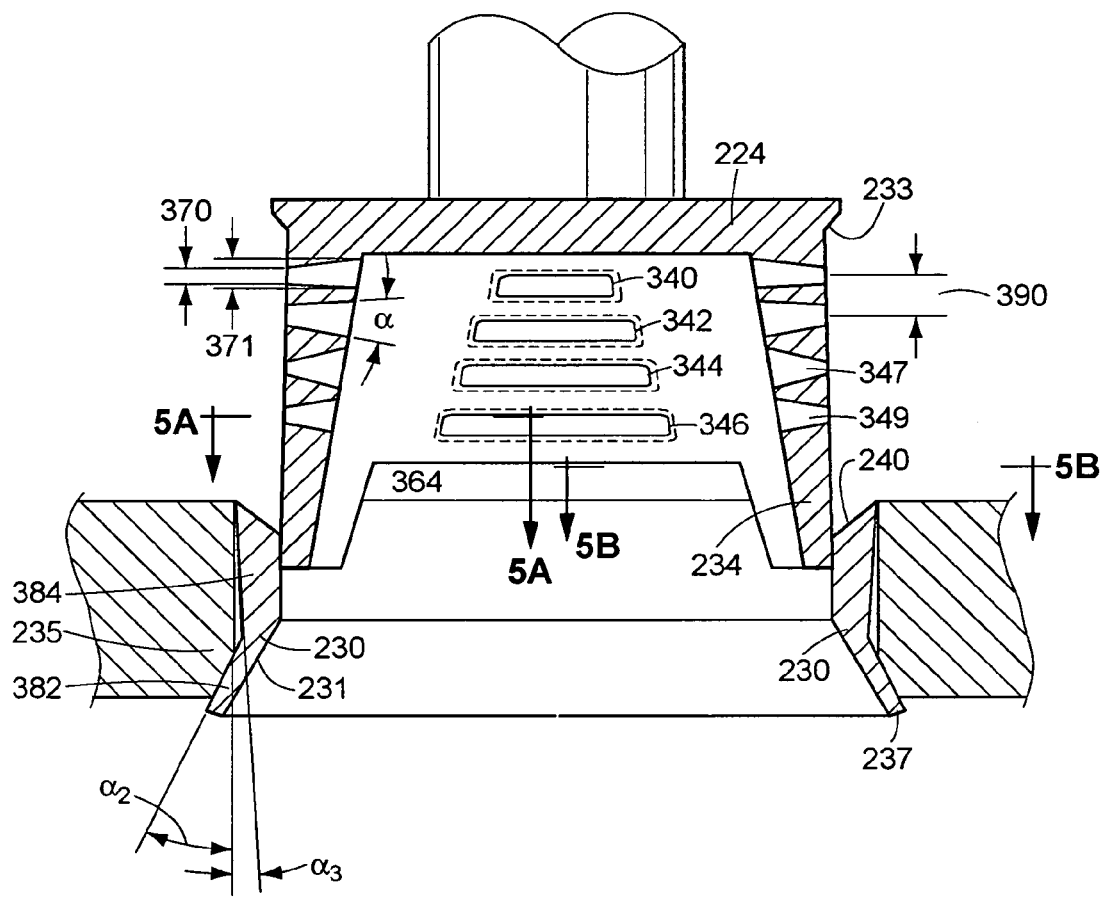
FIG. 3 illustrates a cross-sectional view of a skirted valve plug with a screwed-in seat ring.

Referring now to FIG. 3, an enlarged detailed cross section of control valve 200 is shown to illustrate other characteristics. For example, the cylindrical skirted plug 224 is shown including a plurality of slots 340, 342, 344 and 346 for providing fluid egress there through. In one embodiment, the slots are varied in length to provide gradually decreasing egress area as the valve stem and plug are positioned within valve housing 214 to decrease fluid flow. Thus, as fluid flows through it, the fluid passes through successive layers of slots 340, 342, 344 and 346, depending on the position of the skirted plug 224. In its maximum open position, the fluids also pass through concave opening 364, which will be shown and described in more detail below. These slots provide for a more gradual control of the flow of fluid through the central orifice.

The slots shown are aligned vertically and are elliptically shaped to prevent sharp edges. Although not shown, it will be appreciated by those of skill in the art with the benefit of this disclosure that the slots can also be slanted, either uniformly or nonuniformly to further alter the flow of fluids through the valve. Further, the slots are tapered, as shown with reference to openings 370 and 371, to provide a decreased flow area through the skirt. In other words, the interior area of the slot openings nearest the center of the skirt is greater than the exterior area of the skirted plug 224. In one embodiment, the slots are preferably tapered from the exterior area 363 of the skirted plug 224 at an angle α of between approximately 8 degrees and 30 degrees. The distance between the slots can vary depending on the preferred control characteristics that are desired. For example, the distance 390 can be approximately 0.15 inches.

The opposing slots can also be offset. For example, slot 347 can be offset vertically by approximately 0.075 inches from slots 344 and, likewise, slot 349 can be offset by approximately 0.075 inches from slot 346. In operation, the slots prevent noise and associated problems due to changes in pressure and fluid velocity. The slotted structures serve to further disrupt the flow of fluid as it exits the valve housing.

It is known that a flow entering a small opening will develop a low static pressure causing vaporization of fluid. This vaporization leads to trap gas bubbles that subsequently collapse at a downstream location as pressures again rise, resulting in cavitation, which produce loud noises or even damage to pipes and other components. To avoid this, the liquid is accelerated from the larger cross section at concave opening 364 to the smaller cross section openings of the slots where the fluid vaporizes due to lower static pressure. The vapor is then forced to collapse adjacent to the tapered outlet of each of the slots due to higher downstream pressure. This collapse occurs before gas bubbles can aggregate into large, damaging voids further downstream. Therefore, slots 340, 342, 344 and 346 function to reduce noise at the outlet 218 before more significant noise problems can develop downstream.

Reference is made to the paper entitled Coefficients and Factors Relating to Aerodynamic Sound Level Generated by Throttling Valves, by Hans D. Baumann in the 1984 January-February Noise Control Engineering Journal. The contents of this paper are expressly incorporated herein by reference in its entirety for all purposes. According to this paper, it is recognized that the acoustical efficiency (in other words, noise-generating ability) will vary as a function of the degree of pressure recovery (FL factor) over a range of pressure ratios (for inlet and outlet values). Streamline passages have low FL factors and an abrupt discharge area has a high FL factor that can be close to 1.0. By providing a small cross section at the inlet and a tapered flow path toward the outlet, such as shown and described in this invention, a low FL is provided. Such a low FL is advantageous for high pressure ratios between the inlet and the outlet that are above 2:1 since this generates a lower acoustical efficiency, typically 5–10 dB over that of a high FL passage. However, when the pressure drop is low (below 2:1), a high FL is preferred for lower acoustical efficiency, typically 5–10 dB lower. In this case, the small cross section is located downstream. Hence, a range of slot sizes and configurations can be employed to custom-fit the low noise outlet section to the given pressure conditions of the valve in its normal operating range.

Referring again to FIG. 3, depending on the configuration of the body size of a control valve, the range of slot sizes for slots 340, 342, 344 and 346 are variable and depend on design requirements for custom-fitting the outlet 218 to the given pressure. One embodiment for an approximately two inch body control valve calls for the smallest horizontal length 340 to be approximately 0.250 inches for an area of approximately 0.052 square inches; slot 342 to be approximately 0.58 inches for an area of approximately 0.121 square inches; slot 344 to be approximately 0.275 inches for an area of approximately 0.182 square inches; and slot 346 to be approximately 1.125 inches for an area of approximately 0.236 square inches. The distance between exterior slot openings in the vertical direction can be approximately 0.15 inches; and the exterior opening can be between approximately 0.050 and 0.055 inches wide.

Changes to these measurements can be made proportionally. With these measurements, an egress diameter of the skirted plug 224 can be approximately 1.10 inches, with a port area of approximately 1.1 square inches and a port Cv of approximately 37.4. For a control valve with body of approximately 2 inches using the slot arrangement can achieve a total Cv for the valve of approximately 45.6 with the bottom opening of the skirted plug 224 fully exposed.

FIG. 3 also illustrates an expanded view of a cross section of seat ring 230. As shown, seat ring 230 has an off-vertical tapered lower portion 382 having an angle α2 and an off-vertical upper portion 384 having an angle α3. In one embodiment, the off-vertical upper portion 384 angles inward by approximately 1.5 degrees, although other taper angles are possible, such between approximately 0.5 degrees and 6 degrees, depending on system requirements for a fluid tight press fit between the seat ring and a tapered bore 235 of the valve housing 214. In one embodiment, as shown in more detail in FIG. 3, the tapered portion 231 of the seat ring can be approximately at least 0.5 degrees and no more than approximately six degrees. The off vertical tapered lower portion 382, in one embodiment, angles outward from vertical by approximately 30 degrees.

To manufacture seat ring 230, a rolled, investment-cast or cast steel technique as known in the art can be used. To install seat ring 230, a pressed-in steel technique can be used. More specifically, a first slight taper 235 can be machined into the central orifice of the housing bore prior to insertion of seat ring 230. The taper matches a similar taper on seat ring 230 shown as taper 231. After machining the bore 235, seat ring 230 is pressed into the complimentary taper using a suitable press as is known in the art to extend seat ring from diameter D3 to fit into tapered housing 235. In addition, a fluid-type interface, such as an O-ring (not shown) can be placed between housing 214 and seat ring 230 to assist in sealing the housing 214 to seat ring 230. Alternatively or in addition to using a fluid-type interface, the seat ring 230 can be locked into position by inserting a tool through diameter D0 and rolling the taper 231 into form against the tapered portion 235. In other words, taper 231 is deformed to lock it into position and form a permanent seal. Materials appropriate for seat ring 230 can include stainless steel, nickel alloy, stellite☐ and the like.

Figure 4:
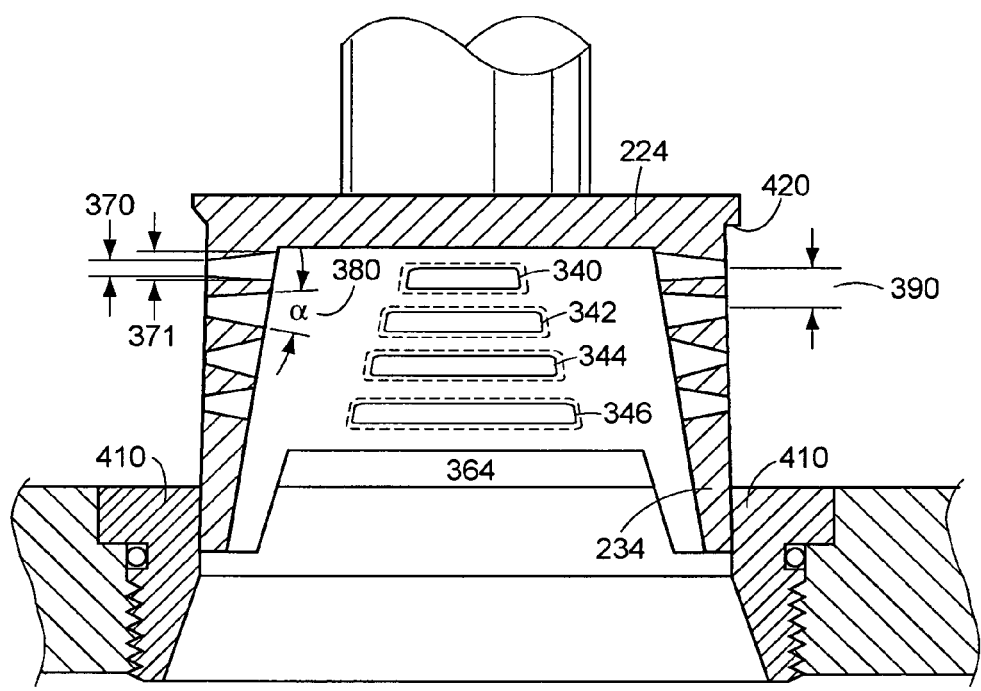
FIG. 4 illustrates a cross-sectional view of a valve plug in accordance with the present invention shown disposed with a seat ring in accordance with the present invention.

FIG. 4 illustrates the same cross section of control valve 200, but with a conventional screwed-in type seat ring. As shown, a control valve designed with cylindrical skirted plug 224 including slots 340, 342, 344 and 346 can be used with a conventional screwed-in seat ring 410 and benefit from the disclosure provided herein. With a conventional seat ring 410, skirted plug 224 is shown with a conventional edge 420 instead of a tapered edge 233 shown in FIGS. 2 and 3. Other geometries of tapered edges are also possible as should be appreciated by one skilled in the art.

Figure 5A:
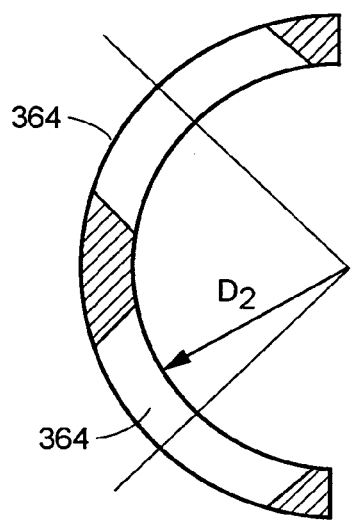
FIGS. 5a and 5b illustrate top views of different cross sections of the valve plug shown along the lines 5a and 5b in FIG. 3 in accordance with the present invention.
Figure 5B:
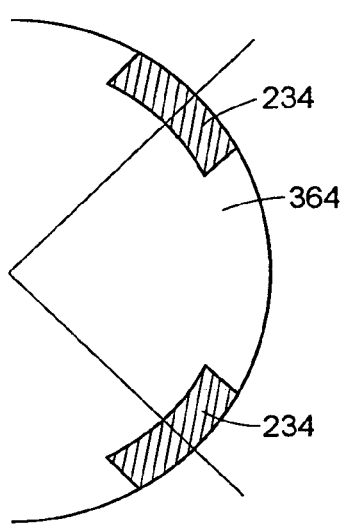

Referring now to FIGS. 5a and 5b in combination with FIG. 3, cross sections at different levels of skirted plug 224 are shown. FIG. 5a in combination with FIG. 3 illustrates a top view cross section of the skirted plug 224 as shown at cross section horizontal 5a in FIG. 3. The slots provide openings 346 as shown in FIG. 5a. FIG. 5b illustrates a top view cross section of the skirted plug 224 between slots 346 and shows cross section horizontal 5b at the bottom of the skirted plug 224 as shown in FIG. 3, including openings 346. A comparison of the cross sections at horizontals 5a and 5b illustrates a travel, i.e., flow through the valve, of greater than 75% when the lower recesses shown concave opening 364 of the skirt are exposed leading to a substantial increase of the flow capacity of the valve. Thus, the maximum Cv for valve 200 is increased relative to other control valves, including skirted control valves.

Figure 6:
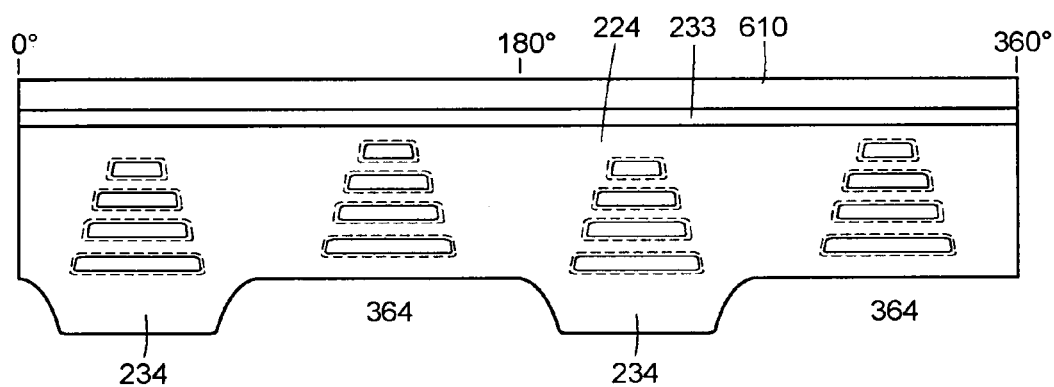
FIG. 6 illustrates a rolled out view of the valve plug in accordance with an embodiment of the present invention.

Referring now to FIG. 6, the exterior surface area of the skirted plug 224 is shown as a rolled out, flattened view of skirted plug 224 to further illustrate the incorporating the slot portions 340, 342, 344 and 346 and concave openings 364. In other words, FIG. 6 shows a 360° view as shown by the degree markings 0°, 180° and 360°. The view illustrates that the slot portions can be offset from one another so that as the valve opens or closes, the number of slots and portions thereof that are opened or closed at any instant in time can be reduced, thereby avoiding jumps in flow rate as more slots are exposed or removed. For example, a slight offset results in no slot being exposed conterminously with another slot, as illustrated by slots 602 and 604. As one of skill in the art will appreciate with the benefit of this disclosure, the offset between slots is subject to design requirements. For example, an embodiment can provide that the number of slots opening at a given level be a linear function of the desired flow rates such that the steps between flow rates are minimized as limited by the number of slots.

Figure 7:
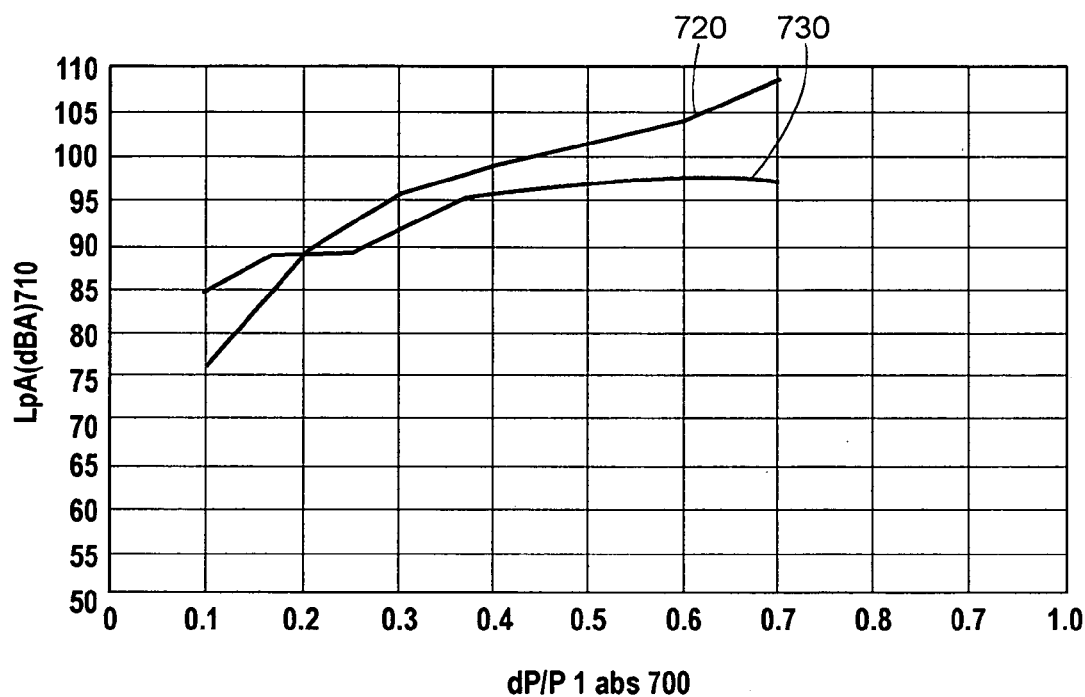
FIG. 7 is a graph illustrating the noise characteristics of a valve designed in accordance with embodiments of the present invention.

Referring now to FIG. 7, a graph illustrates the difference between two control valves shown in FIGS. 1 and 2 with respect to noise characteristics. The prior art control valve measurements relate to a typical two-inch control valve. The measurements are exemplary in nature showing average data for a two-inch control valve of the type shown in FIG. 1. As is known, control valves with low-noise characteristics produce a peak frequency that typically exceeds the ring frequencies of a specific pipe. Frequencies above the ring frequency will attenuate most favorably, decaying at 6 dB per octave. FIG. 7 also provides empirical data for the improved valve described with reference to FIG. 3 having horizontal length 340 to be about 0.250 inches for an area of approximately 0.052 square inches; slot 342 to be about 0.58 for an area of approximately 0.121 square inches; slot 344 to be about 0.275 inches for an area of approximately 0.182 square inches; and slot 346 to be about 1.125 inches for an area of approximately 0.236 square inches. The exemplary two-inch control valve has a distance between exterior slot openings in the vertical direction of about 0.15 inches; and the exterior opening is approximately between 0.050 and 0.055 inches wide.

As shown, the acoustic decibels (dBA) 710 at different ratios of pressure drop versus the absolute inlet pressure (dP/PI) 700. Line 720 provides the noise characteristic curve for known two-inch control valves using a plug configuration, such as valve 10. Line 730 provides the noise characteristic curve for control valve 200, incorporating the slotted skirt design. The embodiment directed to the tapered slotted skirt generates significantly lower decibels, reducing noise by up to 12 dBA for pressures from 0.1 to 0.7 dP/PI over that of a conventional plug.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A control valve comprising:
   a valve housing defining an inlet port and an outlet port;
   a metal ring defining a central orifice and being permanently attached to the valve housing, the metal ring connecting the inlet port and the outlet port and including a tapered external surface for engaging a matching tapered bore within the valve housing; and
   a movable valve plug disposed between the inlet and the outlet, the moveable valve plug having a cylindrical skirt portion slidably engaged within the central orifice, the cylindrical skirt defining a plurality of tapered openings cooperating with the inlet port and outlet port, the cylindrical skirt portion including a lower terminating end incorporating one or more concave openings wherein at least one of the plurality of openings is a slot that expands from the outside diameter of the cylindrical skirt portion at an angle of no less than approximately 8 degrees and no more than approximately 30 degrees.

2. A control valve comprising:
   a valve housing defining an inlet port and an outlet port;
   a metal ring defining a central orifice and being permanently attached to the valve housing, the metal ring connecting the inlet port and the outlet port and including a tapered external surface for engaging a matching tapered bore within the valve housing; and
   a movable valve plug disposed between the inlet and the outlet, the moveable valve plug having a cylindrical skirt portion slidably engaged within the central orifice, the cylindrical skirt defining a plurality of tapered openings cooperating with the inlet port and outlet port, the cylindrical skirt portion including a lower terminating end incorporating one or more concave openings such that the plurality of tapered openings are slots having two or more lengths wherein the lengths progressively increase towards the lower terminating end.

3. The control valve of claim 1 wherein the metal ring has a smallest diameter of the tapered external surface at a lower terminating end and wherein the terminating end further incorporates a thinned and deformable portion capable of being pressed against a portion of the housing to secure the orifice to the valve housing.

4. The control valve of claim 1 wherein the taper of the external surface is at least approximately 0.5 degrees.

5. The control valve of claim 1 wherein the taper of the external surface is less than approximately 6 degrees.

6. The control valve of claim 1 wherein angling the taper of the external surface provides a fluid tight press fit between the metal ring and the tapered bore of the housing.

7. The control valve of claim 2 wherein the metal ring has a smallest diameter of the tapered external surface at a lower terminating end and wherein the terminating end further incorporates a thinned and deformable portion capable of being pressed against a portion of the housing to secure the orifice to the valve housing.

8. The control valve of claim 2 wherein the taper of the external surface is at least approximately 0.5 degrees.

9. The control valve of claim 2 wherein the taper of the external surface is less than approximately 6 degrees.

10. The control valve of claim 2 wherein angling the taper of the external surface provides a fluid tight press fit between the metal ring and the tapered bore of the housing.

* * * * *